(12) United States Patent
Chen

(10) Patent No.: US 11,716,029 B2
(45) Date of Patent: Aug. 1, 2023

(54) POWER SUPPLY CIRCUIT FOR SWITCHING MODE POWER SUPPLY AND CONTROL METHOD THEREOF

(71) Applicant: Chengdu Monolithic Power Systems Co., Ltd., Chengdu (CN)

(72) Inventor: Xuefeng Chen, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 17/833,076

(22) Filed: Jun. 6, 2022

(65) Prior Publication Data
US 2022/0393603 A1 Dec. 8, 2022

(30) Foreign Application Priority Data
Jun. 8, 2021 (CN) .......................... 202110635627.4

(51) Int. Cl.
*H02M 3/335* (2006.01)
*H02M 1/08* (2006.01)
*H02M 3/07* (2006.01)
*H02M 1/00* (2006.01)

(52) U.S. Cl.
CPC ..... *H02M 3/33576* (2013.01); *H02M 1/0006* (2021.05); *H02M 1/0058* (2021.05); *H02M 1/08* (2013.01); *H02M 1/083* (2013.01); *H02M 3/07* (2013.01); *H02M 3/33507* (2013.01)

(58) Field of Classification Search
CPC ........... H02M 3/33576; H02M 1/0006; H02M 1/0058; H02M 1/08; H02M 1/083; H02M 3/07; H02M 3/33507
See application file for complete search history.

(56) References Cited

U.S. PATENT DOCUMENTS

| | | | | |
|---|---|---|---|---|
| 4,404,627 A * | 9/1983 | Marcantonio | ........... | G06F 13/24 710/268 |
| 5,128,604 A * | 7/1992 | Caen | ..................... | H02M 1/083 323/207 |
| 5,982,640 A * | 11/1999 | Naveed | ............. | H02M 3/33523 363/21.16 |
| 6,118,675 A * | 9/2000 | Lionetto | ................. | H02M 1/36 363/21.16 |
| 7,239,532 B1 * | 7/2007 | Hsu | .................... | H02M 3/33523 363/21.16 |
| 7,310,244 B2 * | 12/2007 | Yang | ........................ | H02M 1/44 363/97 |
| 10,135,347 B2 * | 11/2018 | Mizoe | ............... | H02M 3/33507 |
| 10,181,782 B2 * | 1/2019 | Lin | ........................ | H02M 1/083 |
| 10,181,793 B2 * | 1/2019 | Zhang | ................... | H02M 1/083 |
| 10,263,528 B2 * | 4/2019 | Ouyang | ............. | H02M 3/3376 |
| RE47,714 E * | 11/2019 | Morong | ........... | H02M 3/33507 |

(Continued)

*Primary Examiner* — Yusef A Ahmed
(74) *Attorney, Agent, or Firm* — Perkins Coie LLP

(57) ABSTRACT

A power supply circuit for a switching mode power supply, having: a charging capacitor coupled to an auxiliary winding; a power supply diode coupled to a power supply capacitor, wherein the charging capacitor has a connecting terminal coupled to the power supply diode, and the charging capacitor and the power supply diode are serially coupled between the auxiliary winding of the switching mode power supply and the power supply capacitor; and a power supply switch coupled between the connecting terminal and a primary ground of the switching mode power supply.

11 Claims, 9 Drawing Sheets

(56) References Cited

U.S. PATENT DOCUMENTS

| | | | | |
|---|---|---|---|---|
| 10,826,401 B2* | 11/2020 | Wang | | H02M 3/33523 |
| 10,886,854 B2* | 1/2021 | Huang | | H02M 3/33507 |
| 11,387,740 B1* | 7/2022 | Li | | H02M 1/34 |
| 11,611,284 B2* | 3/2023 | Lin | | H02M 1/0064 |
| 2003/0235059 A1* | 12/2003 | Perry | | H02M 3/33592 |
| | | | | 363/21.06 |
| 2006/0028847 A1* | 2/2006 | Ryu | | H02M 1/36 |
| | | | | 363/21.01 |
| 2007/0159143 A1* | 7/2007 | Yang | | H02M 3/33523 |
| | | | | 323/247 |
| 2008/0150503 A1* | 6/2008 | Yang | | H02M 1/08 |
| | | | | 323/282 |
| 2008/0259649 A1* | 10/2008 | Marchand | | H02M 3/33592 |
| | | | | 363/21.01 |
| 2008/0259655 A1* | 10/2008 | Wei | | H03K 3/017 |
| | | | | 327/175 |
| 2008/0278973 A1* | 11/2008 | Lin | | H02M 3/33523 |
| | | | | 363/21.08 |
| 2008/0298095 A1* | 12/2008 | Chuang | | H02M 3/33523 |
| | | | | 363/21.12 |
| 2010/0085776 A1* | 4/2010 | Mimura | | H02M 3/33507 |
| | | | | 363/15 |
| 2011/0019446 A1* | 1/2011 | Wu | | H02M 3/33523 |
| | | | | 363/79 |
| 2011/0103102 A1* | 5/2011 | Chiang | | H02M 3/335 |
| | | | | 363/21.13 |
| 2011/0157941 A1* | 6/2011 | Yedevelly | | H02M 3/33507 |
| | | | | 363/126 |
| 2012/0113684 A1* | 5/2012 | Wang | | H02M 3/335 |
| | | | | 363/21.01 |
| 2012/0176058 A1* | 7/2012 | De Anna | | H02M 3/07 |
| | | | | 363/21.17 |
| 2013/0063987 A1* | 3/2013 | Boku | | H02M 3/335 |
| | | | | 363/21.17 |
| 2014/0146580 A1* | 5/2014 | Koo | | H02M 3/33523 |
| | | | | 363/21.17 |
| 2015/0303824 A1* | 10/2015 | Celani | | H02M 3/335 |
| | | | | 307/104 |
| 2016/0181929 A1* | 6/2016 | Chen | | H02M 1/08 |
| | | | | 363/21.18 |
| 2016/0315541 A1* | 10/2016 | Chen | | H02H 7/1213 |
| 2016/0344294 A1* | 11/2016 | Zhang | | H02M 1/36 |
| 2016/0359419 A1* | 12/2016 | Lin | | H02M 3/33592 |
| 2016/0359420 A1* | 12/2016 | Chen | | H05B 45/10 |
| 2016/0359421 A1* | 12/2016 | Lin | | H02M 1/08 |
| 2017/0104405 A1* | 4/2017 | Pfof | | H02M 1/36 |
| 2017/0288553 A1* | 10/2017 | Fahlenkamp | | H02M 3/33523 |
| 2017/0358981 A1* | 12/2017 | Fujii | | H02M 1/32 |
| 2018/0278076 A1* | 9/2018 | Chen | | H02J 7/007182 |
| 2019/0013737 A1* | 1/2019 | Lin | | H02M 3/33523 |
| 2019/0199222 A1* | 6/2019 | Lin | | H02M 3/33507 |
| 2020/0266704 A1* | 8/2020 | Chen | | H02M 3/156 |
| 2021/0226545 A1* | 7/2021 | Li | | H05B 45/345 |
| 2021/0227664 A1* | 7/2021 | Li | | H05B 45/385 |
| 2022/0014090 A1* | 1/2022 | Hatano | | H02M 1/08 |
| 2023/0119541 A1* | 4/2023 | Chen | | H02M 3/335 |
| | | | | 363/15 |

* cited by examiner

POWER SUPPLY CIRCUIT FOR SWITCHING MODE POWER SUPPLY AND CONTROL METHOD THEREOF

CROSS-REFERENCE TO RELATED APPLICATION(S)

The present application claims the benefit of and priority to China Patent Application No. 202110635627.4 filed Jun. 8, 2021, which is hereby incorporated fully by reference into the present application.

TECHNICAL FIELD

The present invention relates generally to electronic circuits, and more particularly but not exclusively to a power supply circuit for a switching mode power supply.

BACKGROUND

A switching mode power supply, e.g., a Flyback circuit 10 as shown in FIG. 1, comprises a transformer T1 having a primary winding Lp and a secondary winding Ls, a primary switch PM1 coupled to the primary winding Lp of the transformer T1, and a secondary switch Ds coupled to the secondary winding Ls of the transformer T1. The flyback circuit 10 converts an input voltage Vin into an output voltage Vout required by the load LD by controlling the on and off of the primary switch and the secondary switch. As known in the prior art, the primary switch PM1 is typically controlled by a primary switch control signal G1 provided from a primary side control circuit 101 as shown in FIG. 1. The power supply of the primary side control circuit 101 is typically provided by an auxiliary winding La. The auxiliary winding La senses a voltage of the primary winding Lp, and generates the power supply voltage Vcc on the power supply capacitor Cc to provide the power supply to the primary side control circuit 101.

As the power supply is generated by the auxiliary winding La as shown in FIG. 1, the power supply capacitor Cc is charged when the primary switch is turned on. However, when the flyback circuit 10 operates in a burst mode, due to the long time between the adjacent on period of the primary switch PM1, the power supply capacitor Cc needs to power the primary side control circuit 101 for a long time, and can not be charged timely, which leads to voltage drop on the power supply capacitor Cc. As a result, the power supply of the primary side control circuit 101 is insufficient such that the primary side control circuit 101 could not work properly.

SUMMARY

In order to solve the above technical problems, power supply circuit for a switching mode power supply and control methods thereof are provided, in accordance with an embodiment of the present invention, to charge the power supply capacitor and maintain the power supply voltage Vcc when the voltage across the power supply capacitor drops, and thus guarantee the power supply to the primary side control circuit.

According to an embodiment of the present invention, a power supply circuit for a switching mode power supply is provided. The power supply circuit comprises a charging capacitor, a power supply diode, and a power supply switch. The charging capacitor and the power supply diode are serially coupled between an auxiliary winding of the switching mode power supply and a power supply capacitor, where the charging capacitor is coupled to the auxiliary winding, and the power supply diode is coupled to the power supply capacitor. The power supply switch is coupled between a primary ground of the switching mode power supply and a connecting terminal of the charging capacitor and the power supply diode.

According to another embodiment of the present invention, a power supply control circuit is provided. The power supply control circuit comprises a first comparator and a logic circuit. The first comparator is configured to receive a power supply voltage from a power supply circuit and a low voltage threshold, and to provide a low voltage indication signal based on a comparison result of the power supply voltage and the low voltage threshold. The logic circuit comprises a first pulse circuit configured to receive the low voltage indication signal and provide a low voltage on signal, wherein the low voltage on signal is configured to generate a pulse to turn on the power supply switch when the power supply voltage of the power supply circuit is less than the low voltage threshold, and to turn off the power supply switch after the duration of the pulse ends.

According to yet another embodiment of the present invention, a method for controlling a power supply circuit is provided. The power supply circuit comprises a charging capacitor and a power supply diode serially coupled between an auxiliary winding of the switching mode power supply and a power supply capacitor; and a power supply switch coupled between a connecting terminal and a primary ground of the switching mode power supply, where the charging capacitor has the connecting terminal coupled to the power supply diode. The method for controlling the power supply circuit includes the following steps. Whether the primary switch of the switching mode power supply is turn-off is detected. Whether a power supply voltage is not greater than a low voltage threshold is determined. Whether a current flowing through the auxiliary winding is equal to zero is determined. The power supply switch is turned on when the primary switch of the switching mode power supply is turn-off, the power supply voltage is not greater than the low voltage threshold, and the current flowing through the auxiliary winding is equal to zero.

BRIEF DESCRIPTION OF THE DRAWINGS

The present invention can be further understood with reference to the following detailed description and the appended drawings.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the phrases "in one embodiment", "in some embodiments", "in one implementation", and "in some implementations" as used includes both combinations and sub-combinations of various features described herein as well as variations and modifications thereof. These phrases used herein does not necessarily refer to the same embodiment, although it may. Those skilled in the art should understand that the meanings of the terms identified above do not necessarily limit the terms, but merely provide illustrative examples for the terms.

Figure 1:
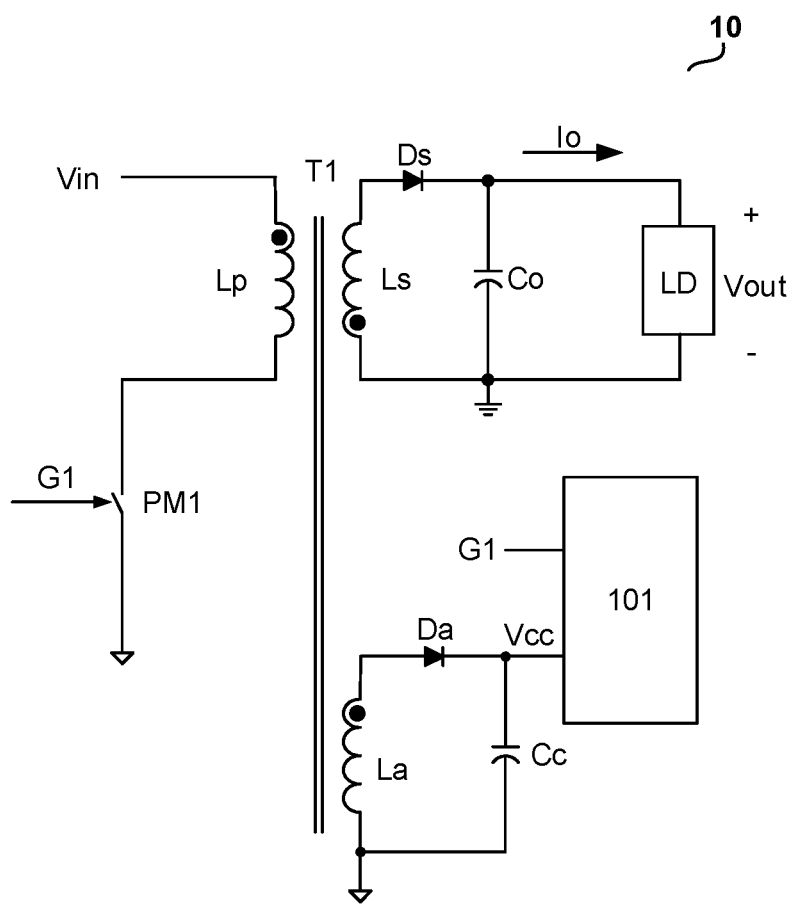
FIG. 1 illustrates a schematic diagram of a prior art Flyback circuit 10.
Figure 2:
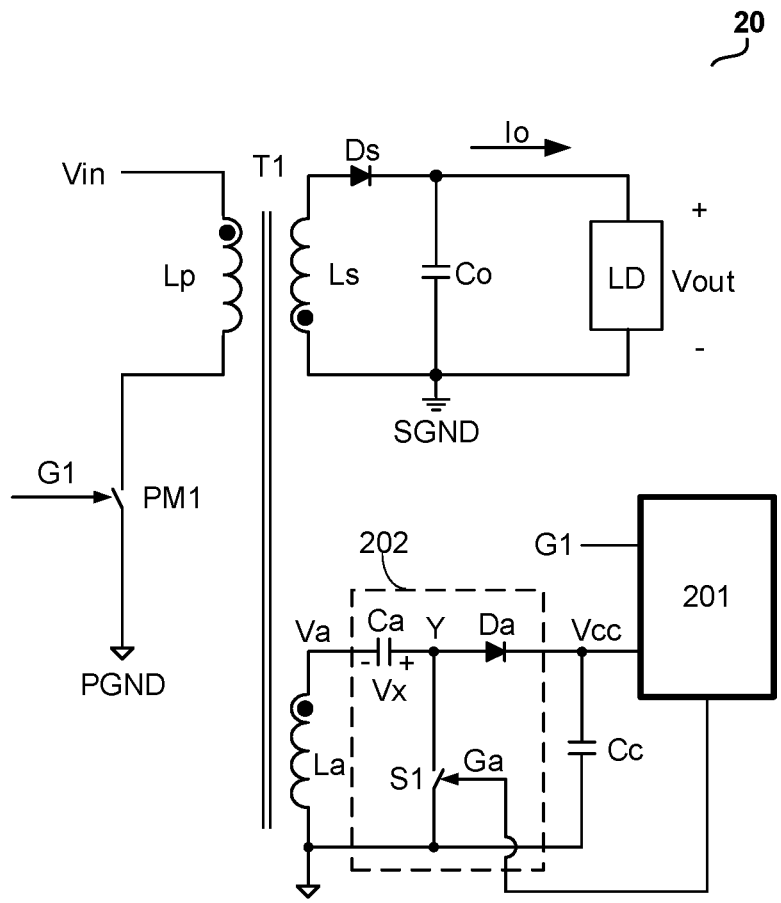
FIG. 2 illustrate a schematic diagram of a switching mode power supply 20 in accordance with an embodiment of the present invention.

FIG. 2 illustrates a schematic diagram of a switching mode power supply 20 in accordance with an embodiment of the present invention. As shown in FIG. 2, the switching mode power supply 20 includes an energy storage component T1 having a primary winding Lp, a secondary winding Ls and an auxiliary winding La; a primary switch PM1 coupled between the primary winding Lp and a primary ground PGND; a secondary switch Ds coupled between the secondary winding Ls and the load LD; a primary side control circuit 201 configured to provide a primary switch control signal G1 to the control terminal of the primary switch PM1; a power supply circuit 202 having a first terminal coupled to the auxiliary winding La, a second terminal coupled to the power supply capacitor Cc, a third terminal configured to receive the charge control signal Ga, and a fourth terminal coupled to the primary ground PGND.

In the embodiment as shown in FIG. 2, the power supply circuit 202 includes a charging capacitor Ca, a power supply diode Da, and a power supply switch S1. The charging capacitor Ca and the power supply diode Da are serially coupled between the auxiliary winding La and the power supply capacitor Cc. The power supply switch S1 comprises a controllable switch coupled between a connecting terminal Y and the primary ground PGND, where the connecting terminal Y is coupled between the charging capacitor Ca and the power supply diode Da, and the power supply switch S1 is configured to receive the charge control signal Ga and is turned on and off based on the control of the charge control signal Ga.

In the embodiment as shown in FIG. 2, when the primary switch PM1 is turned on and the secondary switch Ds is turned off, the auxiliary winding La senses the voltage of the primary winding Vin and generates the auxiliary winding voltage Va across the auxiliary winding La, e.g., Va=Vin× Na/Np, where Na represents the number of turns of the auxiliary winding La, and Np represents the number of turns of the primary winding Lp. The auxiliary winding voltage Va and the voltage Vx across the charging capacitor Ca, i.e., Va+Vx, charge the power supply capacitor Cc via the power supply diode Da, and thus the power supply voltage Vcc is maintained (e.g., Vcc=Va+Vx=Vin×Na/Np+Vx, when the voltage across the power supply diode Da is ignored). When the primary switch PM1 is turned off and the secondary switch Ds is turned on, the auxiliary winding voltage across the auxiliary winding La could be expressed as: Va=−Vout× Na/Ns. In such case, the power supply diode Da is cut off, and the power supply capacitor Cc powers the primary side control circuit 201, and thus the power supply voltage Vcc is reduced as the charge of the power supply capacitor Cc provides to the primary side control circuit 201. When the switching mode power supply 20 operates in continuous conduction mode (CCM), the power supply capacitor Cc may be charged in time such that the power supply voltage Vcc will not drop to below the voltage level that the primary side control circuit 201 could not work properly, e.g., an under-voltage-lockout (UVLO) threshold.

As well known in the prior art, when the switching mode power supply 10 operates in light load or ultra-light load conditions (e.g., a burst mode), the primary switch PM1 and the secondary switch Ds are both turned off for a long time, which may lead to the power supply voltage Vcc drop.

Figure 3A:
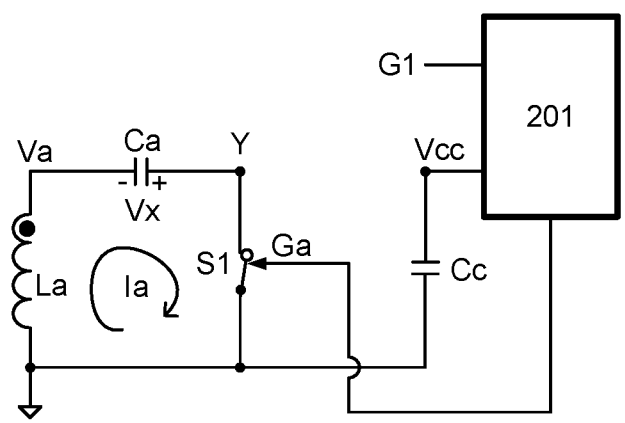
FIG. 3A illustrates an equivalent circuit diagram of the power supply circuit 202 when the switching mode power supply 20 operates in light load or ultra-light load conditions and the power supply switch S1 is turned on in accordance with an embodiment of the present invention.
Figure 3B:
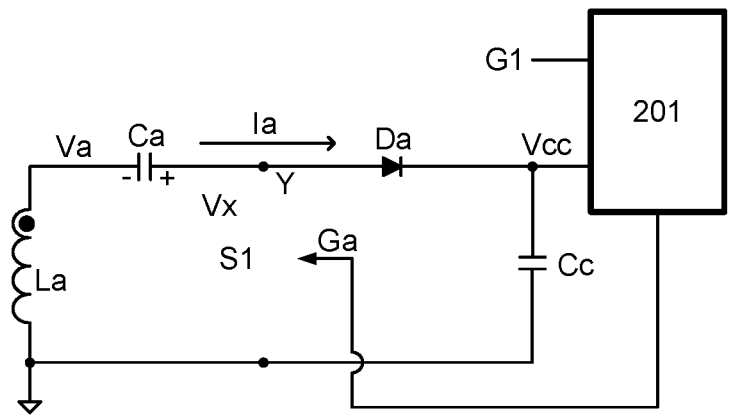
FIG. 3B illustrates an equivalent circuit diagram of the power supply circuit 202 when the switching mode power supply 20 operates in light load or ultra-light load conditions and the power supply switch S1 is turned off in accordance with an embodiment of the present invention.

FIGS. 3A and 3B illustrate equivalent circuit diagrams of the power supply circuit 202 when the switching mode power supply 20 operates in light load or ultra-light load conditions in accordance with an embodiment of the present invention. In accordance with an embodiment of the present invention, when the primary switch PM1 and the secondary switch Ds are both turned off for a long time, the power supply switch S1 is selectively turned on. As shown in FIG. 2 and FIG. 3A, when the power supply switch S1 is turned on, the anode of the power supply diode Da is coupled to the primary ground PGND, and thus the power supply diode Da is cut off, and the charging capacitor Ca charges the auxiliary winding La, where the current Ia flows through the auxiliary winding La in a direction as shown in FIG. 3A. Afterwards, as shown in FIG. 2 and FIG. 3B, the power supply switch S1 is turned off, and the current Ia flowing through the auxiliary winding La charges the power supply capacitor Cc via the charging capacitor Ca and the power supply diode Da to boost the power supply voltage Vcc.

Figure 4:
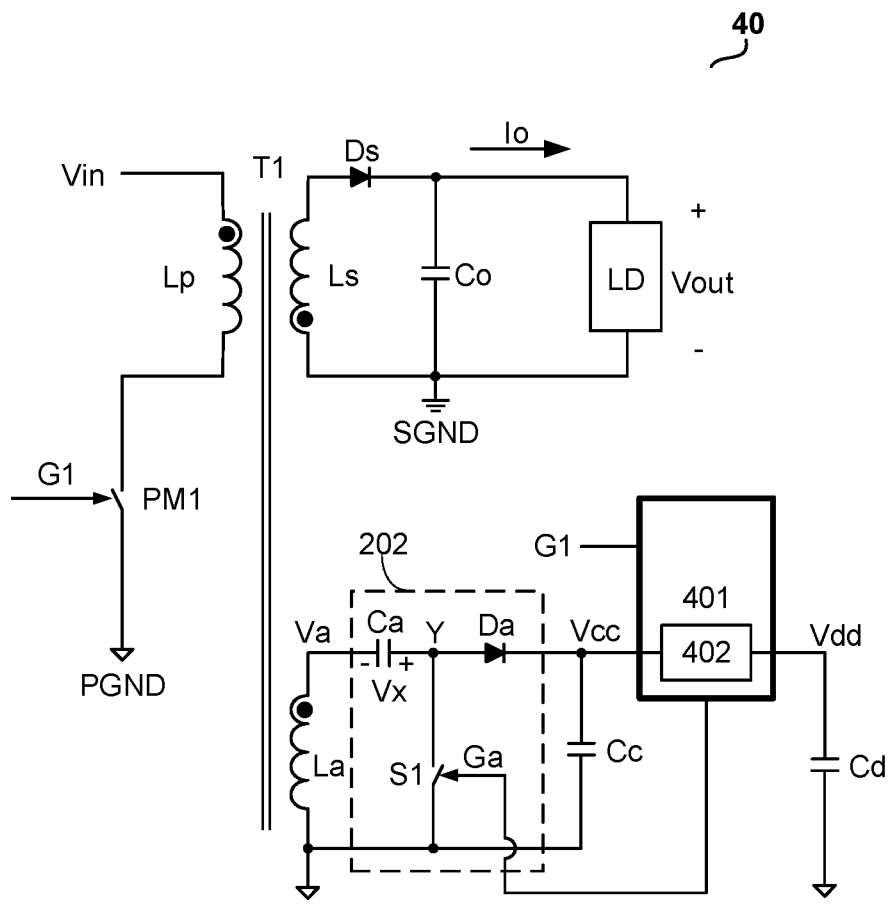
FIG. 4 illustrates a schematic diagram of a switching mode power supply 40 in accordance with an embodiment of the present invention.

FIG. 4 illustrates a schematic diagram of a switching mode power supply 40 in accordance with an embodiment of the present invention. The switching mode power supply 40 as shown in FIG. 4 is similar to the switching mode power supply 20 as shown in FIG. 2. However, in this embodiment, the voltage Vcc across the power supply capacitor Cc of the switching mode power supply 40 is greater than that of the switching mode power supply 20, or a lower output voltage ripple is required by the next stage circuit. In this embodiment, the voltage converter circuit 402 converts the power supply voltage Vcc into the power supply voltage voltage Vdd across the power supply voltage capacitor Cd, and the power supply voltage Vdd is supplied to the primary side control circuit 401. In practical implementations, the voltage converter circuit 402 may be realized by any voltage converter including a low-dropout regulator (LDO), a switching mode power supply, and a charge pump.

Figure 5:
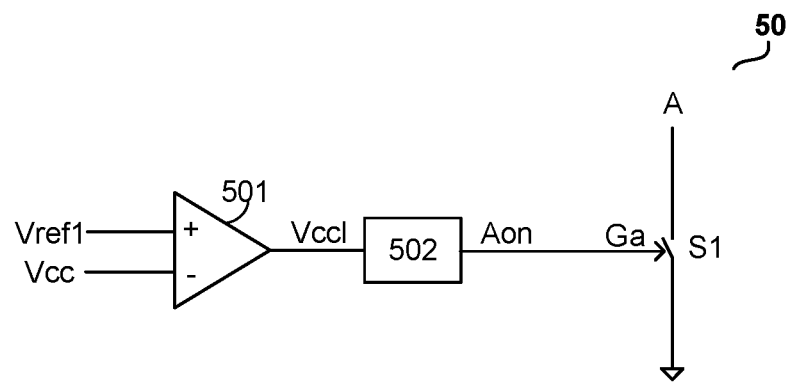
FIG. 5 illustrate a schematic diagram of a power supply control circuit 50 in accordance with an embodiment of the present invention.

FIG. 5 illustrate a schematic diagram of a power supply control circuit 50 in accordance with an embodiment of the present invention. As shown in FIG. 5, the power supply control circuit 50 includes a first comparator 501 configured to receive a power supply voltage Vcc and a low voltage threshold Vref1, and configured to provide a low voltage indication signal Vccl based on a comparison result of the power supply voltage Vcc and the low voltage threshold Vref1; and a first pulse circuit 502 configured to receive the low voltage indication signal Vccl and provide a low voltage on signal Aon. In the embodiment as shown in FIG. 5, the low voltage on signal Aon may be a pulse signal having a pulse width with a preset value, and the low voltage on signal Aon may be applied as the charge control signal Ga provided to the control terminal of the power supply switch S1 in order to control the turn-on or turn-off of the power supply switch S1, and the pulse width of the low voltage on signal Aon could be set according to practical applications.

In one embodiment, when the power supply voltage Vcc is not greater than the low voltage threshold Vref1, the low voltage indication signal Vccl triggers the first pulse circuit 502 to generate a pulse (i.e., the low voltage on signal Aon), and therefore the power supply switch S1 is turned on. During the duration of the pulse of the low voltage on signal Aon, the power supply switch S1 is maintained on and the power supply diode Da is cut-off, and thus the charging capacitor Ca charges the auxiliary winding La, as illustrated in FIG. 3A. After the duration of the pulses of the low voltage on signal Aon ends, the power supply switch S1 is turned off, and due to the inductor resists the change in current, the current Ia flowing through the auxiliary winding La charges the power supply capacitor Cc via the charging capacitor Ca and the power supply diode Da to maintain or boost the power supply voltage Vcc, as illustrated in FIG. 3B.

It should be noted that in practical applications, for different requirements of the primary side control circuit, other signals may also be used to control the power supply switch S1. In other words, the low voltage on signal Aon may not be the only control signal, or may not directly control the power supply switch S1. In some embodiments, a logic operation is performed on the low voltage on signal Aon and other signals to control the power supply switch S1.

Figure 6:
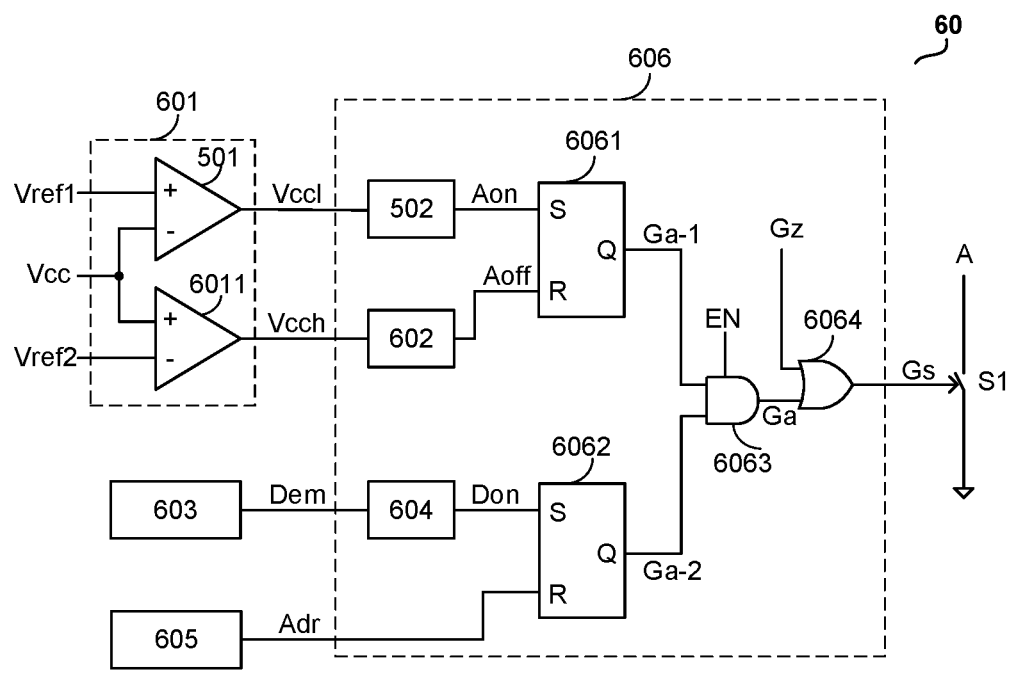
FIG. 6 illustrates a schematic diagram of a switching mode power supply 60 in accordance with an embodiment of the present invention.

FIG. 6 illustrates a schematic diagram of a switching mode power supply 60 in accordance with an embodiment of the present invention. As shown in FIG. 6, the power supply control circuit 60 includes a comparison circuit 601, a zero voltage switching (ZVS) control circuit 605 and a logic circuit 606. In this embodiment, the comparison circuit 601 is configured to receive a power supply voltage Vcc, a low voltage threshold Vref1 and a sufficient voltage threshold Vref2, and configured to provide a sufficient voltage indication signal Vccl based on a comparison result of the power supply voltage Vcc and the low voltage threshold Vref1, and configured to provide a sufficient voltage indication signal Vcch based on a comparison result of the power supply voltage Vcc and the sufficient voltage threshold Vref2. The ZVS control circuit 605 provides a zero voltage time control signal Adr indicating whether the ZVS turn-on time is over. The logic circuit 606 is configured to receive the low voltage indication signal Vccl, the sufficient voltage indication signal Vcch, a demagnetization indication signal Dem, and the zero voltage time control signal Adr, and configured to provide the charge control signal Ga to control the power supply switch S1 based on the low voltage indication signal Vccl, the sufficient voltage indication signal Vcch, the demagnetization indication signal Dem, and the zero voltage time control signal Adr.

In the embodiment as shown in FIG. 6, the logic circuit 606 may include a first pulse circuit 502, a second pulse circuit 602, a third pulse circuit 604, a first logic circuit 6061, a second logic circuit 6062, and a third logic circuit 6063. The first pulse circuit 502 is configured to receive the low voltage indication signal Vccl and provide the low voltage on signal Aon. The second pulse circuit 602 is configured to receive the sufficient voltage indication signal Vcch and provide the sufficient voltage off signal Aoff. The third pulse circuit 604 is configured to receive the demagnetization indication signal Dem and output a demagnetization pulse signal Don based on the demagnetization indication signal Dem. The first logic circuit 6061 has a set terminal S configured to receive the low voltage on signal Aon, a reset terminal R configured to receive the sufficient voltage off signal Aoff, and an output terminal Q configured to provide a power supply voltage indication signal Ga-1. The second logic circuit 6062 has a set terminal S configured to receive the demagnetization pulse signal Don, a reset terminal R configured to receive the zero voltage time control signal Adr, and an output terminal Q configured to provide the charge enable signal Ga-2. The third logic circuit 6063 is configured to receive the power supply voltage indication signal Ga-1 and the charge enable signal Ga-2 and provide the charge control signal Ga based on the power supply voltage indication signal Ga-1 and the charge enable signal Ga-2.

In some implementations, the switching mode power supply applies ZVS technology, that is, the primary switch PM1 of the switching mode power supply is controlled to be turned on when the voltages across the primary switch PM1 is zero or approximately to zero, such that the switching loss could be reduced and thus the efficiency of the switching mode power supply is improved. In some embodiments, the power supply switch S1 is also applied with ZVS control. For instance, the power supply switch S1 is turned on before the primary switch PM1 is turned on, such that a negative current flowing through the auxiliary winding La is generated, while after the power supply switch S1 is turned off, the primary winding Lp senses the induced voltage on the winding La and generates a negative current flowing through the primary winding Lp to discharge a parasitic capacitor across the primary switch PM1, and therefore the voltages across the primary switch PM1 decreases to zero to achieve the ZVS turn-on of the primary switch PM1. In some embodiments, the primary side control circuit of the switching mode power supply may further include an auxiliary winding demagnetization detection circuit 603 and ZVS control circuit 605. The auxiliary winding demagnetization detection circuit 603 is configured to detect whether the current of the auxiliary winding La is reduced to 0, and configured to provide the demagnetization indication signal Dem based on the detection result. The ZVS control circuit 605 is configured to provide the zero voltage time control signal Adr configured to control the turn-off of the power supply switch S1. Additionally, the zero voltage time control signal Adr may be configured to indicate whether the negative current flowing through the auxiliary winding La is able to achieve the ZVS turn-on of the primary switch PM1. In one embodiment, the ZVS control circuit 605 includes a comparator configured to receive the current flowing through the auxiliary winding La and a negative current representation threshold, and configured to provide the zero voltage time control signal Adr to turn off the primary switch PM1 when the current flowing through the auxiliary winding La decreases to the negative current representation threshold.

In one embodiment, the negative current representation threshold may be modified and adjusted by detecting the voltage across the primary switch PM1 at the turn-on of the primary switch PM1, and thus the zero voltage time control signal Adr is adjusted accordingly such that the negative current flowing through the auxiliary winding La generated when the power supply switch S1 is turned off is able to achieve the ZVS turn-on of the primary switch PM1. In one embodiment, the required negative current is estimated with known circuit parameters to generate the negative current representation threshold, and thus the zero voltage time control signal Adr is generated to turn-off the power supply switch S1. In one embodiment of the present invention, the zero voltage time control signal Adr indicates a time that the power supply switch S1 needs to be turned off when ZVS is applied. The realization of the ZVS control is well understood by persons have ordinary skills in the art and therefore the detail description is omitted herein.

In the embodiment as shown in FIG. 6, the demagnetization indication signal Dem and the zero voltage time control signal Adr are used to control the power supply switch S1. When the demagnetization indication signal Dem indicates that the current flowing through the auxiliary winding La decreases to zero, the third pulse circuit 604 provides the demagnetization pulse signal Don to set the second logic circuit 6062 to generate a valid charge enable signal Ga-2. When the zero voltage time control signal Adr indicates that the current flowing through the auxiliary winding La decreases to a set value (e.g., In, where In is a negative value), the second logic circuit 6062 is reset and provides an invalid charge enable signal Ga-2. In one embodiment, the valid signal is used to turn on the power supply switch S1, and the invalid signal is used to turn off the power supply switch S1. For instance, the power supply switch S1 is realized by an n-type MOSFET, the valid signal, i.e., a high voltage level signal is applied to turn on the n-type MOSFET, and the invalid signal, i.e., a low voltage level signal is applied to turn off the n-type MOSFET. In another example, for a p-type MOSFET, the valid signal is a low voltage level signal configured to turn on the p-type MOSFET, and the invalid signal is a high voltage level signal configured to turn off the p-type MOSFET. When the power supply voltage Vcc is not greater than the low voltage threshold Vref1, the low voltage indication signal Vcc1 triggers the first pulse circuit 502, and the first pulse circuit 502 provides the low voltage on signal Aon to set the first logic circuit 6061, and thus the provided power supply voltage indication signal Ga-1 is valid. When both the power supply voltage indication signal Ga-1 and the charge enable signal Ga-2 are valid, the generated charge control signal Ga is also valid, and thus the power supply switch S1 is turned on. When the power supply voltage Vcc is greater than or equal to the sufficient voltage threshold Vref2, the sufficient voltage indication signal Vcch triggers the second pulse circuit 602, and the second pulse circuit 602 provides the sufficient voltage off signal Aoff to reset the first logic circuit 6061, and thus the provided power supply voltage indication signal Ga-1 is invalid. In other words, when both the charge enable signal Ga-2 and the power supply voltage indication signal Ga-1 are valid, the generated charge control signal Ga turns on the power supply switch S1. While when one of the charge enable signal Ga-2 and the power supply voltage indication signal Ga-1 is invalid, the charge control signal Ga turns off the power supply switch S1.

In the embodiment as shown in FIG. 6, the pulse width of the output signals of the first pulse circuit 502, the second pulse circuit 602, and third pulse circuit 604 may be constant and is wide enough to trigger the first logic circuit 6061 and the second logic circuit 6062.

In some implementations that ZVS technology is applied, the primary side control circuit of the switching mode power supply already includes the auxiliary winding demagnetization detection circuit 603 and ZVS control circuit 605, and thus the power supply control circuit 60 does not require the auxiliary winding demagnetization detection circuit 603 and the ZVS control circuit 605, and only needs to receive the demagnetization indication signal Dem, and the zero voltage time control signal Adr for controlling the power supply switch S1.

In one embodiment, as shown in FIG. 6, the logic circuit 606 further includes a fourth logic circuit 6064 configured to receive a zero voltage control signal Gz and the charge control signal Ga and configured to provide the power supply switch control signal Gs to control the power supply switch S1 based on the logic operation result of the zero voltage control signal Gz and the charge control signal Ga. The zero voltage control signal Gz represents the control signal provided to the power supply switch S1 to achieve the ZVS control and other voltage detection functions on the primary switch PM1. For instance, the zero voltage control signal Gz turns on the power supply switch S1 when the primary switch PM1 is turned on, and turns off the power supply switch S1 when the zero voltage time control signal Adr indicates that the current flowing though the auxiliary winding La has reached the set value e.g., In. When the zero voltage control signal Gz controls the power supply switch S1, the charge control signal Ga is blocked or disabled. As shown in FIG. 6, the third logic circuit 6063 includes an AND gate circuit configured to receive the power supply voltage indication signal Ga-1 and the charge enable signal Ga-2, and configured to provide the charge control signal Ga. The AND gate 6063 also receives the ZVS control enable signal EN. When ZVS is implemented by the power supply switch S1, that is, when the zero voltage control signal Gz is used to control the power supply switch S1, the ZVS control enable signal EN disables the AND gate 6063 to provide a low level signal (e.g., logic "0"), and therefore the power supply switch control signal Gs is equivalent to the zero voltage control signal Gz, and is used to control the power supply switch S1. On the other hand, when ZVS is not implemented by the power supply switch S1, that is, when the zero voltage control signal Gz is not used to control the power supply switch S1, the ZVS control enable signal EN enables the AND gate 6063 to provide the AND operation result of the power supply voltage indication signal Ga-1 and charge enable signal Ga-2, i.e., the charge control signal Ga, and controls the power supply switch S1 via the OR gate 6064.

In one embodiment, the ZVS control enable signal EN is generated based on the primary switch control signal G1. For instance, the ZVS control enable signal EN enables the third logic circuit 6063 after the primary switch control signal G1 turns off the primary switch PM1. In another embodiment, the ZVS control enable signal EN is generated based on the zero voltage control signal Gz. For instance, the ZVS control enable signal EN enables the third logic circuit 6063 when the zero voltage control signal Gz is not used to control the power supply switch S1. In some embodiments, any signal that indicates the primary switch PM1 is turned off may be used as the ZVS control enable signal EN. In addition, the ZVS control enable signal EN may also be used to control the first logic circuit 6061, second logic circuit 6062, and/or other modules of the power supply control circuit 60. The ZVS control enable signal EN is mainly used for blocking the charge control signal Ga when the zero voltage control signal Gz controls the power supply switch S1.

In the embodiment as shown in FIG. 6, the first logic circuit 6061 and the second logic circuit 6062 includes an RS Flip-Flop.

It should be understood that the first logic circuit 6061, the second logic circuit 6062, the third logic circuit 6063, and the fourth logic circuit 6064 could be modified according to different types of the input signals and output signals. For instance, in the embodiment as shown in FIG. 6, suppose that the valid power supply voltage indication signal Ga-1 and the valid charge enable signal Ga-2 are set at a high voltage level, i.e., represented as logic "1", and the invalid signals are set at a low voltage level, i.e., represented as logic "0". Accordingly, the third logic circuit 6063 is realized by an AND gate. However, in some embodiments, suppose that the valid power supply voltage indication signal Ga-1 and the valid charge enable signal Ga-2 are set at a low voltage level, and the invalid signals are set at a high voltage level. Accordingly, the third logic circuit 6063 is realized by a NOR gate. Furthermore, when the ZVS control enable signal EN disables the third logic circuit 6063, the charge control signal Ga are at a high voltage level, and the fourth logic circuit 6064 is realized by an AND gate. In some embodiments, the first logic circuit 6061, the second logic circuit 6062, the third logic circuit 6063, and the fourth logic circuit 6064 may be realized by automatically generating digital circuits by hardware description language. Moreover, the voltage level of the above signals may depend on the device type of the power supply switch S1. In one embodiment, the power supply switch S1 may include, but not limited to, a controllable switch, for instance, a MOSFET or a BJT.

It should be noted that the logic circuit 606 as shown in FIG. 6 is only for illustration purpose. However, the present invention is not limited thereto, and it is well understood that the logic circuit 606 could be realized by any logic circuit that applies the above-mentioned features and achieves the above-mentioned functions to control the power supply switch S1.

Although the logic circuit 606 includes the first pulse circuit 502, the second pulse circuit 602, and the third pulse circuit 604, as shown in FIG. 6, these circuits are not required in some other implementations. For instance, in a case that the first logic circuit 6061 is a voltage trigger circuit, a rising-edge trigger circuit, or a falling-edge trigger circuit instead of a pulse trigger circuit, the first pulse circuit 502 and the second pulse circuit 602 are not required. In another implementation, if the second logic circuit 6062 is a voltage trigger circuit, a rising-edge trigger circuit, or a falling-edge trigger circuit, the third pulse circuit 604 is not required. In one embodiment, the logic circuit 606 receives the low voltage indication signal Vccl, the sufficient voltage indication signal Vcch, the demagnetization indication signal Dem, and the zero voltage time control signal Adr, and provides the charge control signal Ga based on the low voltage indication signal Vccl, the sufficient voltage indication signal Vcch, the demagnetization indication signal Dem, and the zero voltage time control signal Adr.

In the embodiment as shown in FIG. 6, the power supply switch control signal Gs is used to control the power supply switch S1. It should be understood that in some embodiments, the fourth logic circuit 6064 is not required and thus the charge control signal Ga are directly used to control the power supply switch S1.

In the embodiment as shown in FIG. 6, the comparison circuit 601 includes a first comparator 501 and a second comparator 6011. The first comparator 501 receives the low voltage threshold Vref1 and the power supply voltage Vcc, and provides the low voltage indication signal Vccl based on the comparison result. The second comparator 6011 receives the sufficient voltage threshold Vref2 and the power supply voltage Vcc, and provides the sufficient voltage indication signal Vcch based on the comparison result. In one embodiment, the low voltage threshold Vref1 is less than the sufficient voltage threshold Vref2.

In some other embodiments, the comparison circuit 601 is realized by a hysteresis comparator, which receives the low voltage threshold Vref1 and the sufficient voltage threshold Vref2 and performs the comparison of the power supply voltage Vcc with the low voltage threshold Vref1, and the sufficient voltage threshold Vref2. In one implementations, the hysteresis comparator may receive only one threshold and has a hysteresis window. The power supply voltage Vcc is compared with the hysteresis window of the threshold, and provides the low voltage indication signal Vccl and the sufficient voltage indication signal Vcch based on the comparison result. The comparison circuit 601 as shown in FIG. 6 is for illustration purpose only. It is well understood for persons skilled in the art that the comparison circuit 601 could be realized by any circuits that provides the low voltage indication signal Vccl indicating whether the power supply voltage Vcc is not greater than the low voltage threshold Vref1 and the sufficient voltage indication signal Vcch indicating whether the power supply voltage Vcc is greater than or equal to the sufficient voltage threshold Vref2.

In one embodiment, the power supply control circuit (e.g., 50 as shown in FIG. 5 or 60 as shown in FIG. 6) may be integrated with the primary side control circuit (e.g., 201 or 401). However, the power supply control circuit (e.g., 50 or 60) may also be not integrated with the primary side control circuit (e.g., 201 or 401). Furthermore, the primary switch PM1 may also be integrated with the primary side control circuit. In other embodiments, the primary switch PM1 is an off-chip component independent to the primary side control circuit.

Figure 7A:
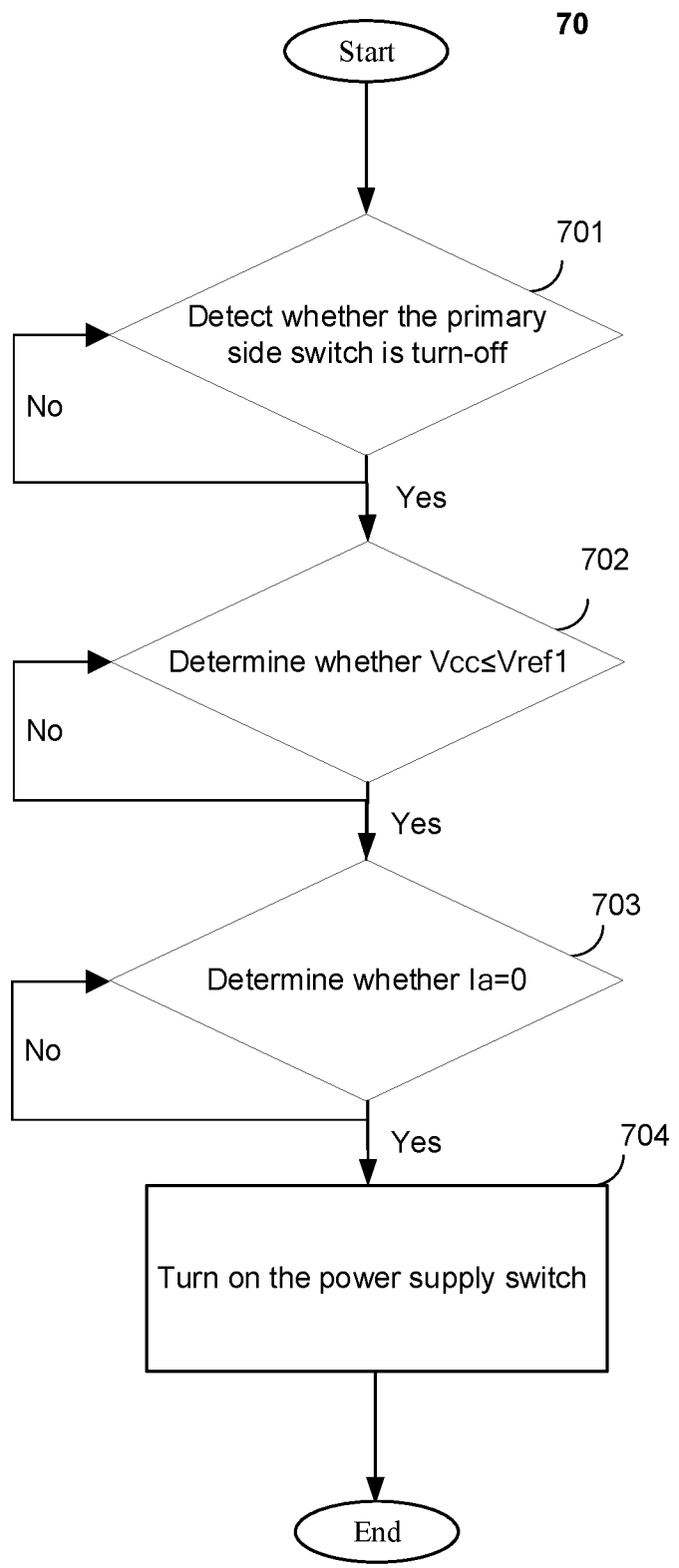
FIGS. 7A-7C Illustrate flowcharts of methods 70, 72, and 74 respectively for controlling a power supply circuit for a switching mode power supply in accordance with embodiments of the present invention.

FIG. 7A Illustrates a flowchart of a method 70 for controlling a power supply circuit for a switching mode power supply in accordance with an embodiment of the present invention. The method 70 may be used to control the power supply circuit 202 as shown in FIG. 2 or the power supply circuit 402 as shown in FIG. 4, where the power supply circuit 202 or 402 includes an auxiliary winding La for charging the power supply capacitor Cc to generate the power supply voltage Vcc across the power supply capacitor Cc. The method includes the following steps.

In step 701, whether the primary switch of the switching mode power supply is turn-off is detected.

In step 702, whether the power supply voltage Vcc is not greater than the low voltage threshold Vref1 is determined.

In step 703, whether the current Ia flowing through the auxiliary winding is equal to zero is determined.

In step 704, the power supply switch S1 is turned on when the primary switch of the switching mode power supply is turn-off, the power supply voltage Vcc is not greater than the low voltage threshold Vref1, and the current Ia flowing through the auxiliary winding is equal to zero.

Although the flowchart of FIG. 7A shows a sequential steps. It is obvious to persons skilled the art that these steps could be performed in any order. In summary, the power supply switch S1 is turned on when the primary switch of the switching mode power supply is turn-off, the power supply voltage Vcc is not greater than the low voltage threshold Vref1, and the current Ia flowing through the auxiliary winding is equal to zero.

Figure 7B:
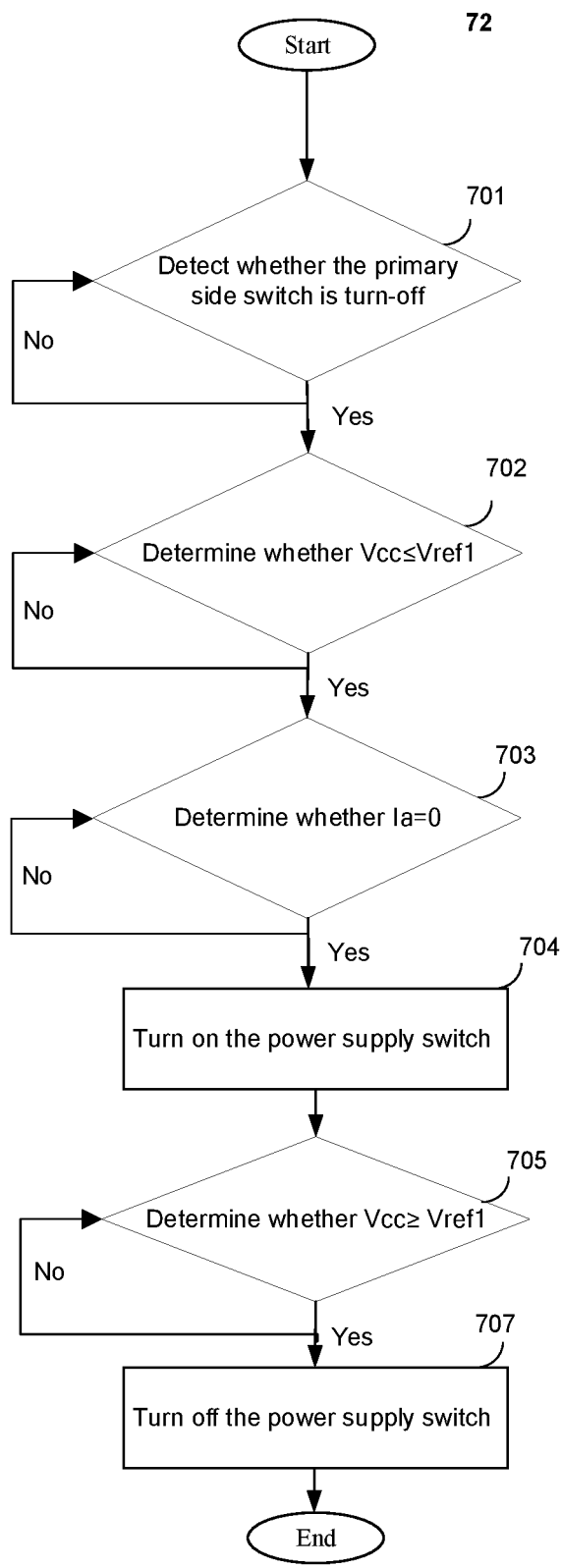

In another embodiment, the control method 72, as shown in FIG. 7B, further includes step 705, whether the power supply voltage Vcc is greater than or equal to the sufficient voltage threshold Vref2 is determined. If so, the power supply switch S1 is turned off at step 707.

Figure 7C:
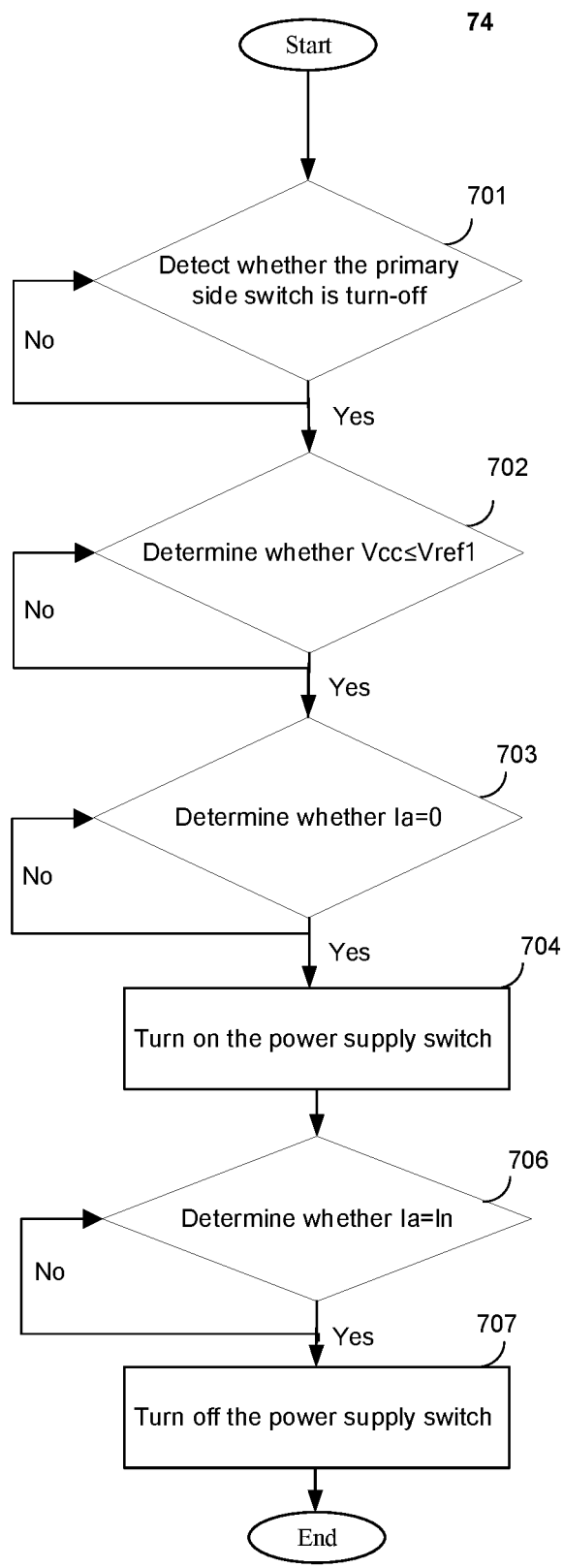

In yet another embodiment, the control method 74, as shown in FIG. 7C, further includes step 706, whether the current Ia flowing through the auxiliary winding La of the switching mode power supply has reached a set value In, where In is a negative value. If so, the power supply switch S1 is turned off at step 707.

In some implementations, the low voltage threshold Vref1 is less than the sufficient voltage threshold Vref2.

It should be noted that, the above steps could be performed in any order.

Figure 8:
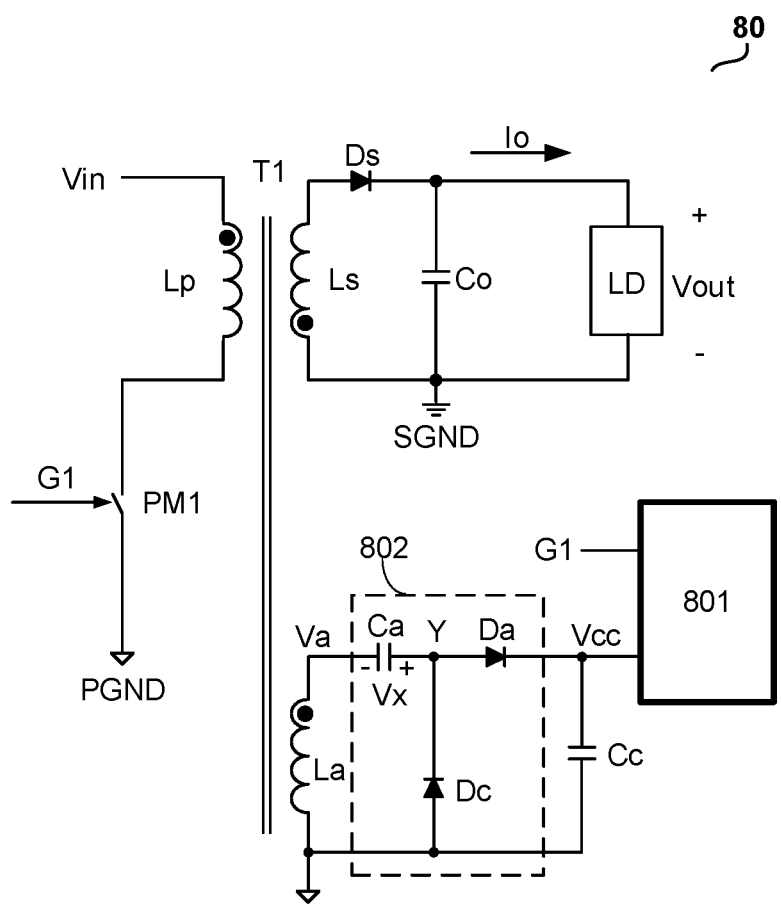
FIG. 8 illustrates a schematic diagram of a switching mode power supply 80 in accordance with an embodiment of the present invention.

FIG. 8 illustrates a schematic diagram of a switching mode power supply 80 in accordance with an embodiment of the present invention. The switching mode power supply 80 as shown in FIG. 8 has similar structure to the mode power supply 20 as shown in FIG. 2. In the embodiment as shown in FIG. 8, the switching mode power supply 80 includes a power supply circuit 802 configured to charge the power supply capacitor Cc coupled to the primary side control circuit 801. As shown in FIG. 8, the power supply circuit 802 includes a charging capacitor Ca, a power supply diode Da, and a power supply switch Dc. However, the power supply circuit 802 as shown in FIG. 8 is different from the power supply circuit 202 as shown in FIG. 2. Specifically, in the embodiment as shown in FIG. 2, the power supply switch S1 of the switching mode power supply 20 includes a controllable switch, and the power supply control circuit provides the charge control signal Ga or the power supply switch control signal Gs to control the power supply switch S1. In contrast, the power supply switch of the switching mode power supply 20 includes a diode Dc. An anode of the diode Dc is coupled to the primary ground PGND of the switching mode power supply 80, and a cathode of the diode is coupled to the connecting terminal Y of the charging capacitor Ca and the power supply diode Da. The dotted terminal of the auxiliary winding La of the switching mode power supply 80 is coupled to the charging capacitor Ca, and the other terminal of the auxiliary winding La is coupled to the primary ground PGND of the switching mode power supply 80.

In the embodiment as shown in FIG. 8, when the primary switch PM1 is turned on and the secondary switch Ds is turned off, the auxiliary winding La senses the voltage Vin across the primary winding Lp and generates the auxiliary winding voltage Va across the auxiliary winding La, e.g., Va=Vin×Na/Np, where Na represents the number of turns of the auxiliary winding La, and Np represents the number of turns of the primary winding Lp. The auxiliary winding voltage Va and the voltage Vx across the charging capacitor Ca, i.e., Va+Vx, charge the power supply capacitor Cc via the power supply diode Da, and thus the power supply voltage Vcc is maintained (e.g., Vcc=Va+Vx=Vin×Na/Np+Vx when the voltage across the power supply diode Da is ignored). When the primary switch PM1 is turned off and the secondary switch Ds is turned on, the auxiliary winding voltage across the auxiliary winding La could be expressed as: Va=−Vout×Na/Ns. As shown in FIG. 8, the voltage of the connecting terminal Y could be expressed as: Vx+Va Vx−Vout×Na/Ns, which is less than the voltage of the cathode terminal of the power supply diode Dc, i.e., the power supply voltage expressed as: Vcc=Vin×Na/Np+Vx, and thus the power supply diode Da is cut off, and the current Ia flows from the dotted terminal of the auxiliary winding La and the diode Dc to charge the charging capacitor Ca, and the voltage across the charging capacitor Ca could be expressed as: Vx=Vout×N/Ns. When the primary switch PM1 and the secondary switch Ds are both turned off, the power supply diode Da and the diode Dc are cut off, and the voltage Vx across the charging capacitor Ca is maintained the same. After the primary switch PM1 is turned on again, the new cycle begins and the above operations repeats.

Figure 9:
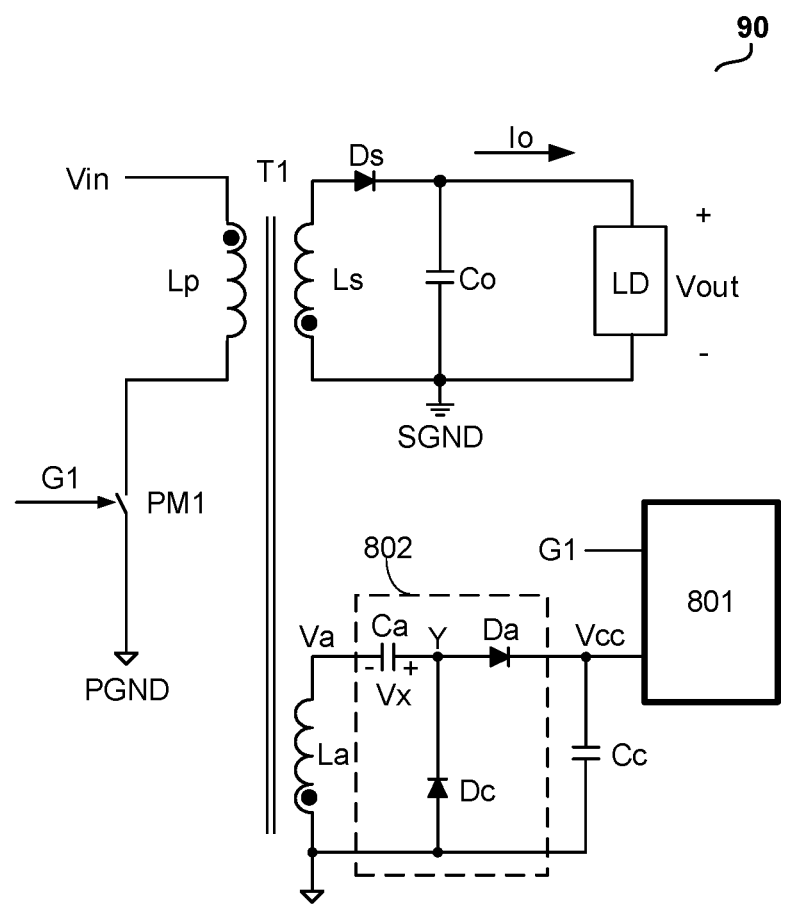
FIG. 9 illustrates a schematic diagram of a switching mode power supply 90 in accordance with an embodiment of the present invention.

FIG. 9 illustrates a schematic diagram of a switching mode power supply 90 in accordance with an embodiment of the present invention. The switching mode power supply 90 as shown in FIG. 9 has similar structure to the mode power supply 80 as shown in FIG. 8. However, in this embodiment, the dotted terminal of the auxiliary winding La of the switching mode power supply 90 and the cathode terminal of the diode Dc are both coupled to the primary ground PGND.

In the embodiment as shown in FIG. 9, when the primary switch PM1 is turned on and the secondary switch Ds is turned off, the auxiliary winding La senses the voltage Vin across the primary winding Lp and generates the auxiliary winding voltage Va across the auxiliary winding La, e.g., Va=Vin×Na/Np, where Na represents the number of turns of the auxiliary winding La, and Np represents the number of turns of the primary winding Lp. Meanwhile, the diode Dc is turned on, and therefore the current Ia flowing though the auxiliary winding La charges the charging capacitor Ca, and the voltage across the charging capacitor Ca could be expressed as: Vx=Vin×Na/Np. When the primary switch PM1 is turned off and the secondary switch Ds is turned on, the auxiliary winding voltage across the auxiliary winding La could be expressed as: Va=Vout×Na/Ns. The voltage of the connecting terminal Y could be expressed as: Vx+Va=Vx+Vout×Na/Ns, and thus the power supply diode Da is turned on, and the voltage of the connecting terminal Y charge the power supply capacitor Cc via the power supply diode Da. When the primary switch PM1 and the secondary switch Ds are both turned off, the power supply diode Da and the diode Dc are cut off, and the voltage Vx across the charging capacitor Ca is maintained the same. After the primary switch PM1 is turned on again, the new cycle begins and the above operations repeats.

In the embodiments as shown in FIG. 8 and FIG. 9, the voltage across the charging capacitor Ca and the voltage across the auxiliary winding La charges the power supply capacitor Cc. Therefore, in contrast to the prior art, the charging capacitor Ca shares the voltage providing to the power supply capacitor Cc, such that the voltage across the auxiliary winding La could be relatively low. As a result, the number of turns of the auxiliary winding La may be reduced, and thus the circuits cost could be further reduced.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. A power supply circuit for a switching mode power supply, the power supply circuit comprising:
a charging capacitor coupled to an auxiliary winding;
a power supply diode coupled to a power supply capacitor, wherein the charging capacitor has a connecting terminal coupled to the power supply diode, and the charging capacitor and the power supply diode are serially coupled between the auxiliary winding of the switching mode power supply and the power supply capacitor; and
a power supply switch coupled between the connecting terminal and a primary ground of the switching mode power supply,
wherein the power supply switch comprises a controllable switch, and the power supply circuit further comprises:
a power supply control circuit, comprising:
  a comparison circuit configured to receive a power supply voltage, a low voltage threshold and a sufficient voltage threshold, configured to provide a low voltage indication signal based on a comparison result of the power supply voltage and the low voltage threshold, and provide a sufficient voltage indication signal based on a comparison result of the power supply voltage and the sufficient voltage threshold, wherein the power supply voltage is generated based on a voltage of the power supply capacitor; and
  a logic circuit configured to receive the low voltage indication signal, the sufficient voltage indication signal, a demagnetization indication signal and a zero voltage time control signal, and provide a charge control signal to control the power supply switch based on the low voltage indication signal, the sufficient voltage indication signal, the demagnetization indication signal and the zero voltage time control signal;
  wherein the demagnetization indication signal indicates whether a current flowing through the auxiliary winding of the switching mode power supply is zero, and the zero voltage time control signal is configured to control the turn-off of the power supply switch, and
  wherein the logic circuit comprises:
a first logic circuit having a set terminal configured to receive the low voltage indication signal, a reset terminal configured to receive the sufficient voltage indication signal, and an output terminal configured to provide a power supply voltage indication signal;
a second logic circuit having a set terminal configured to receive the demagnetization indication signal, a reset terminal configured to receive the zero voltage time control signal, and an output terminal configured to provide a charge enable signal;
  a third logic circuit configured to receive the power supply voltage indication signal and the charge enable signal, and provide the charge control signal based on the power supply voltage indication signal and the charge enable signal, and
a fourth logic circuit configured to receive a zero voltage control signal and the charge control signal, and configured to provide a power supply switch control signal to control the power supply switch based on a logic operation result of the zero voltage control signal and the charge control signal;
wherein the third logic circuit is further configured to receive a zero voltage switching (ZVS) control enable signal, and the ZVS control enable signal is configured to disable the third logic circuit.

2. The power supply circuit of claim 1, wherein the logic circuit further comprises:
a first pulse circuit configured to receive the low voltage indication signal and to provide a low voltage on signal;
a second pulse circuit configured to receive the sufficient voltage indication signal and to provide a sufficient voltage off signal; and
a third pulse circuit configured to receive the demagnetization indication signal, and to provide a demagnetization pulse signal based on the demagnetization indication signal.

3. The power supply circuit of claim 1, wherein the comparison circuit comprises:
a first comparator configured to receive the low voltage threshold and the power supply voltage, and to provide the low voltage indication signal based on the comparison result of the voltage threshold and the power supply voltage; and
a second comparator configured to receive the sufficient voltage threshold and the power supply voltage, and to provide the sufficient voltage indication signal based on the comparison result of the sufficient voltage threshold and the power supply voltage.

4. The power supply circuit of claim 1, further comprising:
a primary side control circuit coupled to the power supply capacitor and configured to receive the power supply voltage.

5. The power supply circuit of claim 4, further comprising:
a primary switch configured to receive a primary switch control signal provided by the primary side control circuit, wherein the primary switch is turned on and off based on the primary switch control signal;
wherein the primary switch is coupled to a primary winding, and a dotted terminal of the auxiliary winding of the switching mode power supply is coupled to the primary ground.

6. The power supply circuit of claim 4, further comprising:
a primary switch configured to receive a primary switch control signal provided by the primary side control circuit, wherein the primary switch is turned on and off based on the primary switch control signal;
wherein the primary switch is coupled to a primary winding, and a dotted terminal of the auxiliary winding is coupled to the charging capacitor.

7. The power supply circuit of claim 1, further comprising:
a voltage converter circuit configured to convert a voltage of the power supply capacitor into a power supply voltage.

8. A power supply control circuit for a switching mode power supply, the power supply control circuit comprising:
a first comparator configured to receive a power supply voltage from a power supply circuit and a low voltage threshold, and to provide a low voltage indication signal based on a comparison result of the power supply voltage and the low voltage threshold;

a second comparator configured to receive a sufficient voltage threshold and the power supply voltage, and to provide a sufficient voltage indication signal based on a comparison result of the sufficient voltage threshold and the power supply voltage; and a logic circuit, the logic circuit comprising:
  a first pulse circuit configured to receive the low voltage indication signal and provide a low voltage on signal; and
  a second pulse circuit configured to receive the sufficient voltage indication signal and provide a sufficient voltage off signal;
wherein the low voltage on signal is configured to generate a pulse to turn on a power supply switch when the power supply voltage of the power supply circuit is less than the low voltage threshold, and to turn off the power supply switch after the duration of the pulse ends,
  wherein the logic circuit further receives a demagnetization indication signal, and a zero voltage time control signal, and configured to provide a charge control signal to control the power supply switch based on the low voltage indication signal, the sufficient voltage indication signal, the demagnetization indication signal, and the zero voltage time control signal;
  wherein the demagnetization indication signal indicates whether a current flowing through an auxiliary winding of the switching mode power supply is zero, and the zero voltage time control signal is configured to control the turn-off of the power supply switch, and
  wherein the logic circuit further comprises:
    a first logic circuit having a set terminal configured to receive the low voltage on signal, a reset terminal configured to receive the sufficient voltage off signal, and an output terminal configured to provide a power supply voltage indication signal;
    a second logic circuit having a set terminal configured to receive the demagnetization indication signal, a reset terminal configured to receive the zero voltage time control signal, and an output terminal configured to provide a charge enable signal;
    a third logic circuit configured to receive the power supply voltage indication signal and the charge enable signal, and provide the charge control signal based on the power supply voltage indication signal and the charge enable signal, and
    a fourth logic circuit configured to receive a zero voltage control signal and the charge control signal, and configured to provide a power supply switch control signal to control the power supply switch based on a logic operation result of the zero voltage control signal and the charge control signal;
  wherein the third logic circuit is further configured to receive a zero voltage switching (ZVS) control enable signal, and the ZVS control enable signal is configured to disable the third logic circuit.

9. The power supply control circuit of claim 8, wherein the logic circuit further comprises:
  a third pulse circuit configured to receive the demagnetization indication signal, and provide a demagnetization pulse signal based on the demagnetization indication signal.

10. A power supply circuit for a switching mode power supply, the power supply circuit comprising:
  a charging capacitor coupled to an auxiliary winding;
  a power supply diode coupled to a power supply capacitor, wherein the charging capacitor has a connecting terminal coupled to the power supply diode, and the charging capacitor and the power supply diode are serially coupled between the auxiliary winding of the switching mode power supply and the power supply capacitor; and
  a power supply switch coupled between the connecting terminal and a primary ground of the switching mode power supply,
    wherein the power supply switch comprises a controllable switch, and the power supply circuit further comprises:
  a power supply control circuit, comprising:
    a comparison circuit configured to receive a power supply voltage, a low voltage threshold and a sufficient voltage threshold, configured to provide a low voltage indication signal based on a comparison result of the power supply voltage and the low voltage threshold, and provide a sufficient voltage indication signal based on a comparison result of the power supply voltage and the sufficient voltage threshold, wherein the power supply voltage is generated based on a voltage of the power supply capacitor; and
    a logic circuit configured to receive the low voltage indication signal, the sufficient voltage indication signal, a demagnetization indication signal and a zero voltage time control signal, and provide a charge control signal to control the power supply switch based on the low voltage indication signal, the sufficient voltage indication signal, the demagnetization indication signal and the zero voltage time control signal;
  wherein the demagnetization indication signal indicates whether a current flowing through the auxiliary winding of the switching mode power supply is zero, and the zero voltage time control signal is configured to control the turn-off of the power supply switch,
  wherein the logic circuit comprises:
    a first pulse circuit configured to receive the low voltage indication signal and to provide a low voltage on signal;
    a second pulse circuit configured to receive the sufficient voltage indication signal and to provide a sufficient voltage off signal;
    a third pulse circuit configured to receive the demagnetization indication signal, and to provide a demagnetization pulse signal based on the demagnetization indication signal;
    a first logic circuit having a set terminal configured to receive the low voltage on signal, a reset terminal configured to receive the sufficient voltage off signal, and an output terminal configured to provide a power supply voltage indication signal;
    a second logic circuit having a set terminal configured to receive the demagnetization pulse signal, a reset terminal configured to receive the zero voltage time control signal, and an output terminal configured to provide a charge enable signal; and
    a third logic circuit configured to receive the power supply voltage indication signal and the charge enable signal, and to provide the charge control signal based on the power supply voltage indication signal and the charge enable signal;
  wherein the third logic circuit is further configured to receive a zero voltage switching (ZVS) control enable signal, and the ZVS control enable signal is configured to disable the third logic circuit.

11. A power supply control circuit for a switching mode power supply, the power supply control circuit comprising:
  a first comparator configured to receive a power supply voltage from a power supply circuit and a low voltage threshold, and to provide a low voltage indication signal based on a comparison result of the power supply voltage and the low voltage threshold;
  a second comparator configured to receive a sufficient voltage threshold and the power supply voltage, and to provide a sufficient voltage indication signal based on a comparison result of the sufficient voltage threshold and the power supply voltage; and
  a logic circuit, the logic circuit comprising:
    a first pulse circuit configured to receive the low voltage indication signal and provide a low voltage on signal; and
    a second pulse circuit configured to receive the sufficient voltage indication signal and provide a sufficient voltage off signal;
  wherein the low voltage on signal is configured to generate a pulse to turn on a power supply switch when the power supply voltage of the power supply circuit is less than the low voltage threshold, and to turn off the power supply switch after the duration of the pulse ends,
    wherein the logic circuit further receives a demagnetization indication signal, and a zero voltage time control signal, and configured to provide a charge control signal to control the power supply switch based on the low voltage indication signal, the sufficient voltage indication signal, the demagnetization indication signal, and the zero voltage time control signal;
    wherein the demagnetization indication signal indicates whether a current flowing through an auxiliary winding of the switching mode power supply is zero, and the zero voltage time control signal is configured to control the turn-off of the power supply switch, and
  wherein the logic circuit further comprises:
    a third pulse circuit configured to receive the demagnetization indication signal, and provide a demagnetization pulse signal based on the demagnetization indication signal;
  a first logic circuit having a set terminal configured to receive the low voltage on signal, a reset terminal configured to receive the sufficient voltage off signal, and an output terminal configured to provide a power supply voltage indication signal;
  a second logic circuit having a set terminal configured to receive the demagnetization pulse signal, a reset terminal configured to receive the zero voltage time control signal, and an output terminal configured to provide a charge enable signal; and
  a third logic circuit configured to receive the power supply voltage indication signal and the charge enable signal, and provide the charge control signal based on the power supply voltage indication signal and the charge enable signal,
  wherein the third logic circuit is further configured to receive a zero voltage switching (ZVS) control enable signal, and the ZVS control enable signal is configured to disable the third logic circuit.

* * * * *